United States Patent
Emmanuel et al.

(10) Patent No.: US 10,257,236 B2
(45) Date of Patent: *Apr. 9, 2019

(54) SENSOR GATEWAY

(71) Applicant: NETGEAR, INC., San Jose, CA (US)

(72) Inventors: Joseph Amalan Arul Emmanuel, Cupertino, CA (US); Peiman Amini, Mountain View, CA (US)

(73) Assignee: NETGEAR, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/988,678

(22) Filed: May 24, 2018

(65) Prior Publication Data
US 2018/0270274 A1 Sep. 20, 2018

Related U.S. Application Data

(63) Continuation of application No. 14/558,085, filed on Dec. 2, 2014, now Pat. No. 9,998,501.

(51) Int. Cl.
*H04L 29/06* (2006.01)
*H04W 16/14* (2009.01)
*H04W 88/16* (2009.01)

(52) U.S. Cl.
CPC ........... *H04L 65/102* (2013.01); *H04W 16/14* (2013.01); *H04W 88/16* (2013.01); *Y02D 70/00* (2018.01); *Y02D 70/126* (2018.01); *Y02D 70/142* (2018.01); *Y02D 70/146* (2018.01); *Y02D 70/22* (2018.01); *Y02D 70/26* (2018.01)

(58) Field of Classification Search
CPC ..... H04W 84/12; H04W 16/14; H04W 88/16; H04L 65/102; Y02D 70/26; Y02D 70/14

USPC ......................................................... 370/338
See application file for complete search history.

(56) References Cited

U.S. PATENT DOCUMENTS

| | | |
|---|---|---|
| 9,277,591 B2 | 3/2016 | Amini et al. |
| 2008/0089277 A1 | 4/2008 | Alexander et al. |
| 2008/0137624 A1 | 6/2008 | Silverstrim et al. |
| 2011/0183685 A1 | 7/2011 | Burton et al. |
| 2015/0215950 A1* | 7/2015 | Amini ............... H04W 52/0212 370/252 |

(Continued)

FOREIGN PATENT DOCUMENTS

| | | |
|---|---|---|
| CN | 102124784 A | 7/2011 |
| CN | 102523633 A | 6/2012 |

(Continued)

*Primary Examiner* — Christopher R Crompton
(74) *Attorney, Agent, or Firm* — Perkins Coie LLP

(57) ABSTRACT

A sensor gateway manages wireless communications to sensors and the exchange of data between the sensors and a connection to the Internet. A sensor gateway processor runs the network and wireless stack, automatically picks the same channel as the home access point (AP), and runs sensor software to provide the sensors with low power, wireless support and deep sleep support. The sensor gateway selects same channel as the home AP by following the strongest beacon or by following the home AP service set identifier (SSID), in case more than one strong beacon is present. If the home AP and sensor gateway are placed close by and are on a different channel in 2.4G, there is destructive interference between the two devices. By using same channel on the sensor gateway as that of the home AP, both devices can coexist in same band without destructive interference.

34 Claims, 10 Drawing Sheets

(56) References Cited

U.S. PATENT DOCUMENTS

| | | |
|---|---|---|
| 2016/0044661 A1 | 2/2016 | Suresh |
| 2016/0156673 A1 | 6/2016 | Amini et al. |
| 2017/0013556 A1 | 1/2017 | Tanaka et al. |
| 2017/0135543 A1 | 5/2017 | Halloran et al. |
| 2017/0149900 A1 | 5/2017 | Moriguchi et al. |

FOREIGN PATENT DOCUMENTS

| | | |
|---|---|---|
| CN | 102595487 A | 7/2012 |
| CN | 103517321 A | 1/2014 |
| WO | 2010104267 | 9/2010 |

\* cited by examiner

SENSOR GATEWAY

CROSS-REFERENCE TO RELATED APPLICATION

This application is a continuation of U.S. patent application Ser. No. 14/558,085, filed Dec. 2, 2014, which application is incorporated herein in its entirety by this reference thereto.

FIELD

The invention relates to wireless sensors. More particularly, the invention relates to a sensor gateway that manages wireless communications to sensors and the exchange of data between the sensors and a connection to a backend.

BACKGROUND

Wireless sensor networks provide an effective way of gathering data and also open up new sensing opportunities. Wireless sensor networks can be more useful if the data can be effectively retrieved from the sensor network. However, such networks typically operate in the Wi-Fi bands and are subject to interference.

Wi-Fi interference is a common and troublesome issue. The lack of wires that makes WLAN so attractive is also the feature that makes other consumer devices capable of causing Wi-Fi interference. Because the air is shared by all transmitters, transmissions by any device at the same frequency as an access point's (AP) radio can cause interference. Because 802.11 wireless networks operate in unlicensed bands used by many technologies, such as microwave ovens, video surveillance cameras, cordless phones, they are subject to interference. In addition, wireless access points sharing the same channel might interfere with each other. The effect of interference is highly dependent on the strength of the transmission and the distance from the interferer. Access points closest to and on the same channel as an interferer are affected more than those that are further away. Co-channel interference or adjacent channel interference can result from setting radios to bands that have overlapping channels. The channels might not all be in use by a network—neighboring signals can also cause interference.

While various coexistence techniques are known for mitigating the negative effects of such interference (see commonly assigned U.S. patent application Ser. No. 14/089,680, filed Nov. 25, 2013, entitled Channel Steering for Implementing Coexistence of Multiple Homogeneous Radios), running a physical coexistence bus is not always possible.

It would be desirable to provide techniques that increase wireless network bandwidth, reduce wireless network interference, and reduce sensor power consumption.

SUMMARY

Embodiments of the invention provide a sensor gateway that manages wireless communications to sensors and the exchange of data between the sensors and a connection to a backend, such as the Internet. A sensor gateway processor runs the network and wireless stack, automatically picks the same channel as the home access point (AP) or gateway, and runs sensor software to provide the sensors with low power, wireless support and deep sleep support. The sensor gateway selects the same channel as the home AP or gateway by following the strongest beacon or by following the home AP service set identifier (SSID), in case more than one strong beacon is present. If the home AP or gateway and sensor gateway are placed close by and are on a different channel in the 2.4 GHz, there is destructive interference between the two devices. By using same channel on the sensor gateway as that of the home AP or gateway, both devices can coexist in same band without destructive interference.

DETAILED DESCRIPTION

Figure 1:
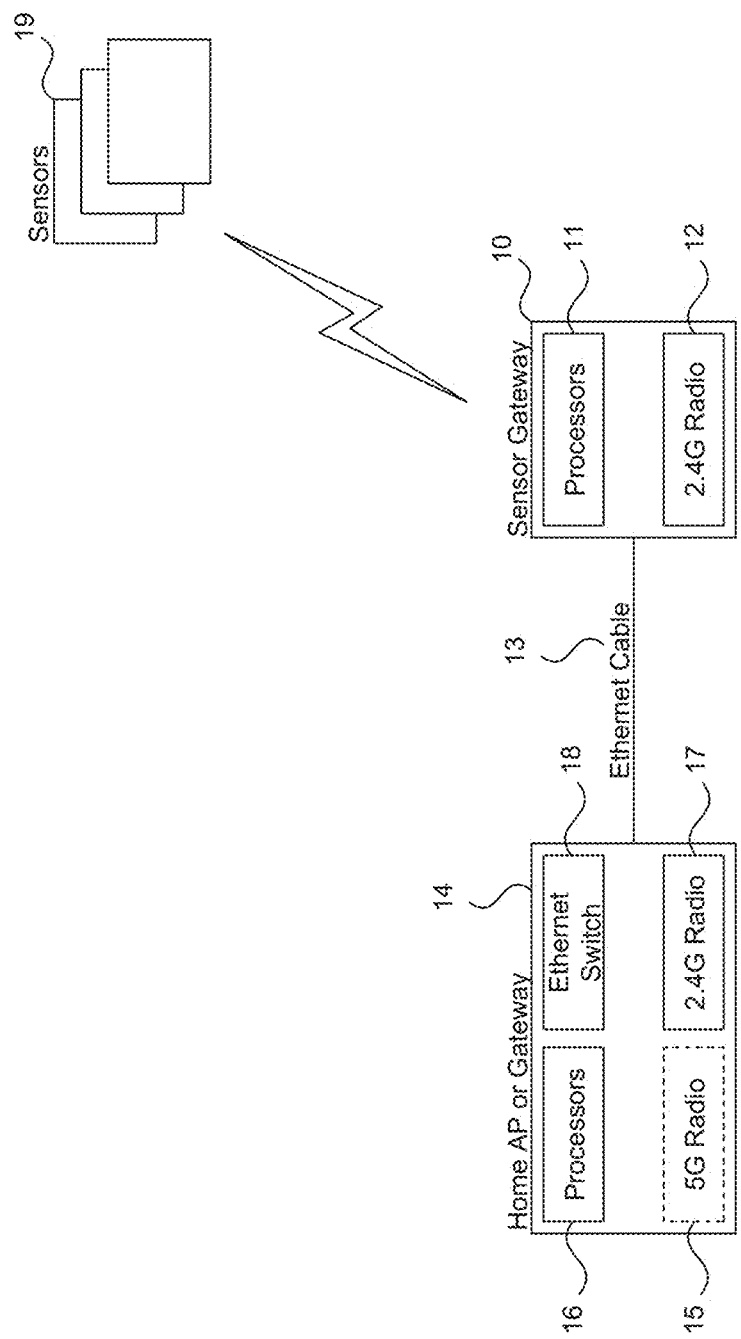
FIG. 1 is a block schematic diagram showing a sensor gateway and home AP according to the invention.

Embodiments of the invention provide a sensor gateway that manages wireless communications to sensors and the exchange of data between the sensors and a connection to a backend, such as the Internet. FIG. 1 is a block schematic diagram showing a sensor gateway, associated sensors 19, and a home AP or gateway according to the invention. In FIG. 1, a sensor gateway 10 includes a 2.4 GHz radio 12 and a processor 11 that runs the network and wireless stack, automatically picks the same channel as the home access point (AP) or gateway, and runs sensor software to provide the sensors with low power, wireless support and deep sleep support. In the embodiment of the invention shown in FIG. 1, an Ethernet cable 13 connects the sensor gateway to the home AP 14 for the exchange of sensor data therebetween.

In some embodiments of the invention, the sensor gateway is connected to the home AP using a cable. Other embodiments of the invention use Wi-Fi on a band that is different than the sensor's band to connect the sensor gateway to the home AP. For example, the 5 GHz band can be used to connect to the home AP, and the 2.4 GHz band can be used to connect to the sensors. In other embodiments of the invention, the sensors operate in the low part of the 5 GHz band and there is a connection to the home AP on the high part of the 5 GHz band and vice versa. In the 5 GHz band, a coexistence bus is not needed because the 5 GHz band is a wide band that can use filters to avoid interference.

The home AP typically includes a 2.4 GHz radio 17, processors 16, and an Ethernet switch 18. The home AP or gateway may also include additional radios, such as a 5 GHz radio 15. While the invention is described herein in connection with the 2.4 GHz band, those skilled in the art will appreciate that the invention can be practiced in any frequency band and, as such, is not limited to the 2.4 GHz band.

The sensor gateway selects the same channel as the home AP or gateway by following the strongest beacon or by following the home AP or gateway service set identifier (SSID), in case more than one strong beacon is present. If the home AP or gateway and sensor gateway are placed close by and are on a different channel in the 2.4 GHz band, there is destructive interference between the two devices. By using same channel on the sensor gateway as that of the home AP or gateway, both devices can coexist in same band without destructive interference.

A key reason that the sensor gateway and home AP or gateway are both put on the same channel is that they can listen to each other. If the sensor gateway and home AP or gateway know that they are on the same channel they can transmit a back off signal to share the band. If they are on different channels, e.g. one is on channel six and one is on channel eleven, then they are not listening to each other. In such case, they interfere with each other because the transmit time is not scheduled. However, if they are both on channel six and one is transmitting, then the other can hear that transmission and back off.

Embodiments of the sensor gateway also provide a power saving function. For example, sensor-related software is run on the sensor gateway when the gateway exchanges data between the sensors and the outside world. The software that runs on the sensor gateway manages ultra power saving features that are required on low power sensors, such as low power cameras. Some of the low power software features that are supported on the sensor gateway are not supported on a normal AP. For example, the sensor gateway only forwards the packets that are necessary for a sensor node and it filters the unnecessary packets. In other embodiments of the invention, the sensor gateway does not require the usual keep-alive packet and other periodic transactions that may be needed on a normal AP to keep the link alive and thus saves battery power on low power sensors.

The sensor gateway also buffers the data from the sensors and then sends the data to a cloud backend. In embodiments of the invention, the cloud backend comprises any of different types of severs, such as the Amazon Elastic Compute Cloud (EC2) service. Therefore, the sensor does not need to have all of the required software API to connect directly to a cloud backend. Rather, it only needs to send its data to the local sensor gateway. This saves power on the sensors and it also simplifies the software on the sensors In embodiments of the invention, the sensor gateway controls the rate at which the sensor sends data to the gateway and/or the rate at which the gateway sends data to the cloud backend. If sensor gateway sees that queues are building up in the gateway and it cannot send the data to the cloud backend and, thus, clear the queues, the sensor gateway can send a command to the sensors and ask them to slow down the rate at which they send data to the gateway. The gateway can also choose to drop some of the unnecessary data from some of the sensors. For example, if the sensor is a camera, the sensor gateway may tell the camera which compression parameter to use to send the video, based on the Internet pipe it sees between the gateway and the cloud backend. The parameters the gateway can change include, for example, frame per second (fps), group of pictures (GOP) size, target output bit rate, etc. for H264 codecs and/or other parameters for other video codecs.

The 2.4 GHz band is typically the preferred band of operation because of range and RF power consumption considerations. Some of the common home AP or gateway implementations do not support the sleep requirement of the sensors. In embodiments of the invention, the sensor gateway hosts software (daemons, etc.) that receives sensory information from sensors within a home or office, processes the information, and sends selected processed information to the outside world (cloud, peer2peer, etc.). In embodiments of the invention, the software on the sensor gateway communicates to the outside world backend and/or includes an API implementation to communicate to the outside world.

There are cloud management aspects that are more suitable to run on a base station and not run on a low power sensor, for example setting up connections, managing connection parameters, software upgrades, buffering when the Internet connection is slow, buffering when sever the is not responding, etc.

Moreover, the memory and processing footprint of the software that manages all of the backend connections is too large for a relatively low cost sensor. The gateway disclosed herein removes complexity from the sensors and puts it in base station. Embodiments of the invention provide a central controller, i.e. the gateway, in a modern home in which there are several sensors and controls, referred to as the Internet of things (IOT). In such setting, the gateway handles complexities that otherwise would need to be implemented on every sensor.

Embodiments of the invention also address security and privacy. Because the gateway manages the connection to the cloud backend, there is a central point in the home that manages what data goes out to the cloud backend and what data does not. The gateway also manages what controls and commands come from the cloud backend and what should be filtered. The sensors are typically relatively simple devices that are not secure enough for many Internet of things (IOT) applications.

Embodiments of the invention provide local storage on the gateway so that it is not necessary to store all of the sensor data in the cloud backend. This is valuable for users who do not trust the cloud backend with their data, and who prefer to have their data stored locally. This also can save cost because cloud storage typically has a service charge that must be paid every month. In embodiments of the invention, the gateway controls a local storage device. Without the gateway most sensors would not be able to write data directly to flash disk or other type of local storage.

The power saving function of the sensor gateway exploits the fact that the sensors wake up less often than normal stations (STAs). Because of this wake-up trait of the sensors, the home AP or gateway typically disassociates them. The sensors must then, upon awakening, rejoin the AP or gateway. This drains the battery of the sensor unnecessarily. The sensor gateway accommodates the sensor's less frequent wake-up schedule. Thus, in embodiments of the invention the sensor gateway disconnects the sensors less often by increasing their time out values.

The sensor gateway can also reduce the packet exchange with the sensors that is required for authentication, encryption key exchange, and other security related mechanisms. This can be done by keeping some of the information for a longer time and not redoing all of the steps every time the sensor disconnects and reconnects.

The sensor gateway can also assign an IP address to a sensor and keep the IP address, such that the sensor does not need to go through the DHCP protocol every time it disconnects and reconnects.

In embodiments of the invention, the Wi-Fi protocol used by the sensor gateway for communication with the sensors is modified so that the sensors can use less energy, such that their batteries last longer. In a typical Wi-Fi AP, the sensors must wake up once a second and send a keep alive packet, etc. that wastes power. The sensor gateway changes the protocol. Consider a camera that can operate for six months on a battery. Without these modifications, the battery would last no more than a day.

There are several changes to the Wi-Fi protocol to implement this aspect of the invention. The regular 802.11 access point has an interval in which it expects the client to wake up and check with the AP for any downlink traffic. If the AP signals to the client there that is downlink traffic, the client wakes up from sleep and signals to the AP to send the traffic to the client. The regular period in which the client is expected to check with the AP in a normal 802.11 AP is suitable for most applications where there is a maximum delay requirement. The information that the client checks to see if it needs to wake up is referred to as the traffic indication map (TIM) and the delivery traffic indication map (DTIM), each of which are transmitted in every beacon that the AP transmits. AP beacons are typically transmitted once every 100 ms and low power clients must wake up to check one out of four beacons, which means that the sensor must wake once every 400 ms.

Some of the sensors that are deployed according to the invention, including cameras, do not have the delay requirement that is typical for data or voice. As such, they do not need to check with the AP as often as a cell phone, laptop, or other normal data client. Therefore, the gateway does not expect those sensors to check as often for any downlink traffic. As such, the client can wake up, e.g. once every second, once every ten seconds, or less often.

When a client does not receive a beacon that it wakes up to receive or a few beacons, it comes out of power save mode and it turns on the radio until it hears a beacon. So, if a few beacons are missed with a normal AP, the client wakes up to receive until it sees a beacon. Because the beacon interval is 100 ms with a normal AP, the client may need to be awake for up to 100 ms to sync to a beacon, but 100 ms is a very long time for low power clients.

In embodiments of the invention, the gateway sends a beacon more frequently than one beacon every 100 ms. In some embodiments of the invention, the gateway sends a beacon every 25 ms. By transmitting more beacons, the wake up time is decreased for a client that has gone out of sync or a client that does not receive beacon because there is interference. Thus, when the client wakes up to sync to a beacon, the next beacon is transmitted, and thus received by the client, at most in 25 ms compared to 100 ms with a typical AP Because all of the APs are transmitting beacons with same period, there is a chance the beacons from two APs can collide with each other. For example, if a user's AP and their neighbor's AP end up transmitting beacons at the same time, the beacons may collide on the client and the client cannot hear any of the beacons. Embodiments of the invention address this problem by using a beacon period that is not 100 ms/X or 100 ms*X. For example, if the beacon period is 31 ms on a user's gateway and the beacon collides with a neighbor's beacon the next beacon definitely does not collide.

A further reason for providing a sensor gateway as disclosed herein is to buffer the sensor data and to sends the data out to the network. The sensor gateway thus buffers the data for the backend and saves power that the sensor would otherwise have to use to send its data to the backend.

Beacon timing on the sensor AP is more accurate than that of the normal APs or gateways. The beacon is transmitted at a higher data rate to make the sensor, e.g. a camera, wake up time shorter. The beacon on a normal AP is transmitted at 1 Mbps in the 2.4G band and at 6 Mbps in the 5 GHz band. Embodiments of the invention increase the beacon data rate in the 2.4 GHz band to 2 Mbps and, therefore, the beacon duration is half of the beacon duration of a normal AP. It is possible to increase the beacon data rate to higher rates. A side effect of increasing the beacon data rate is reduced range, but a power amplifier having higher power output compensates for range loss that results using higher data rates. Beacon content is reordered so the important data comes first and the sensor can go to sleep faster. In embodiments of the invention, the sensor gateway may not poll the sensor STA to see if the sensor is there. Rather, the sensor gateway waits for the sensor to send a keep-alive or other form of message to indicate that the STA is still there.

Figure 2:
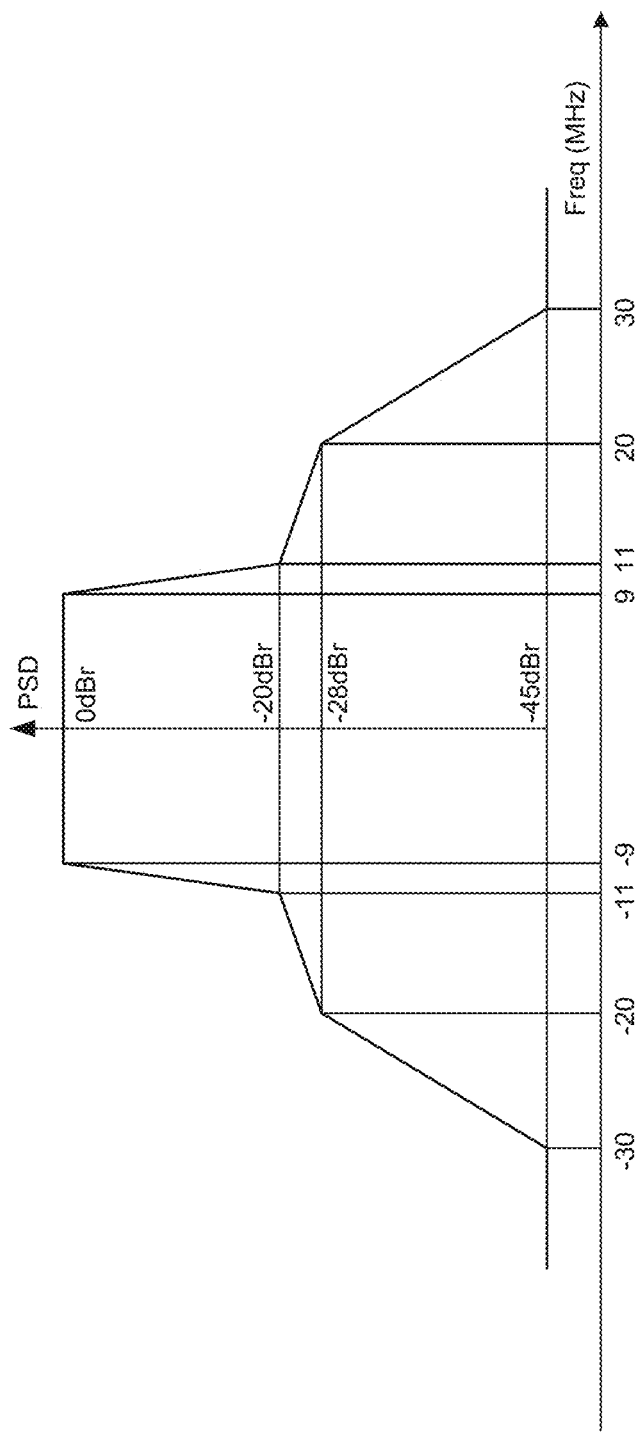
FIG. 2 is a graph showing an IEEE 20 MHz mask in 2.4G.
Figure 3:
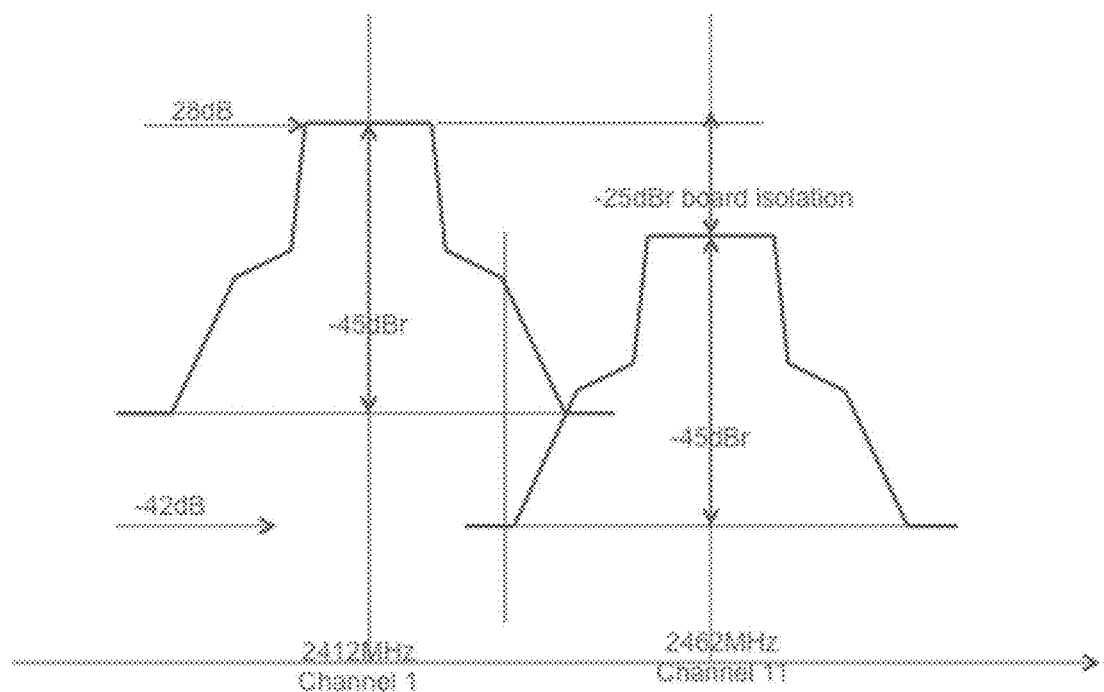
FIG. 3 is a graph that shows channel 11 to channel 6 in-band interference.
Figure 4:
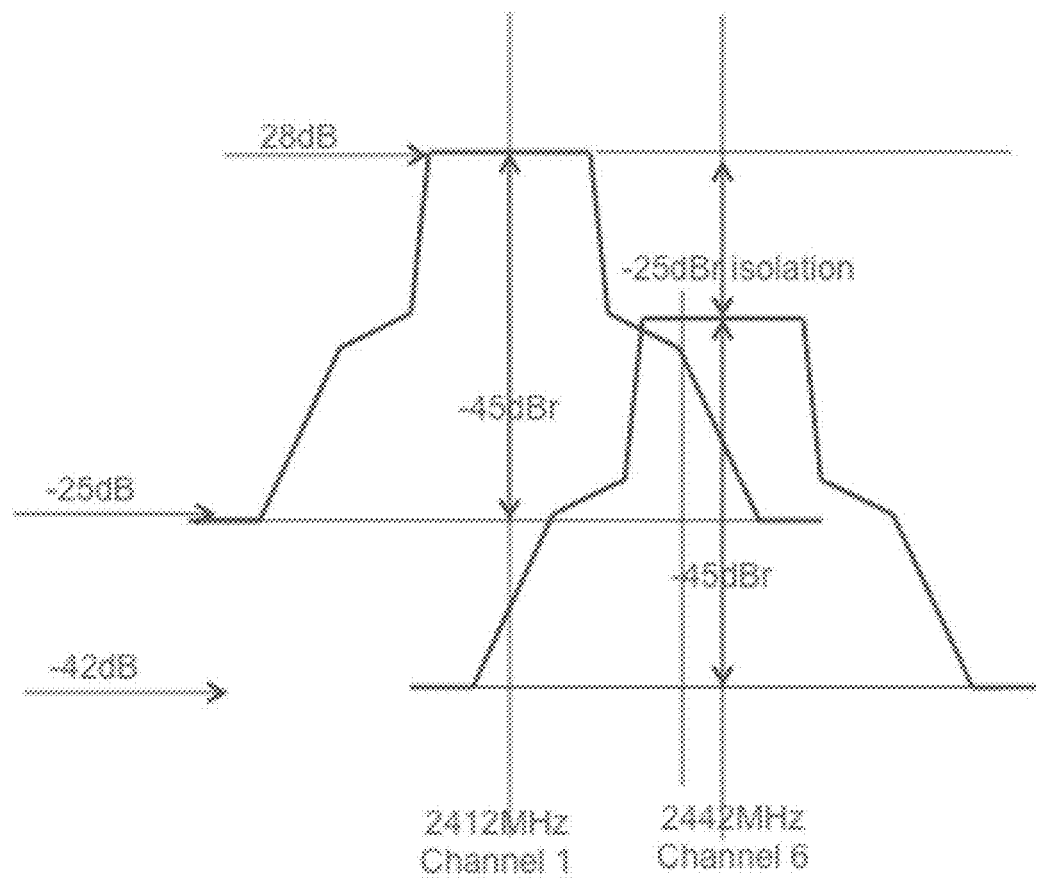
FIG. 4 is a graph that shows channel 1 to channel 6 in-band interference.

FIG. 2 is a graph showing an IEEE 20 MHz mask in 2.4G. If the home AP or gateway and the sensor gateway are on different 2.4 G channels there is destructive interference from the home AP or gateway to the sensor gateway and vice versa due to out-of-band interference to the receiver resulting in frontend saturation and in-band interference to the receiver due to spectral masking. Further, the CSMA/CA system does not work because home gateway and the sensor gateway cannot decode each other's packets. For example, FIG. 3 is a graph that shows channel 11 to channel 6 in-band interference that results in receiver desensitization and, therefore, destructive interference; and FIG. 4 is a graph that shows channel 1 to channel 6 in-band interference that results in receiver desensitization and, therefore, destructive interference.

In operation, the sensor gateway chooses the same channel as that of the home AP or gateway if the home AP or gateway and sensor gateway are proximate to each other. To do this, the sensor gateway looks for the strongest beacon and, if there is only one AP or gateway beacon that is stronger than the others by a predetermined margin, e.g. 10 dB, then the channel on which the strongest beacon is transmitted is picked.

If there are two or more sets of strong beacons with almost same power then, the user interface (UI) shows the SSID that should be used and lets the user pick the main AP or gateway in the home. The basic service set identifier (BSSID) which has more traffic in the traffic monitoring system is picked as the home AP or gateway. If there is no home AP or gateway seen in close range, i.e. the beacon power is smaller than a threshold, then the cleanest 2.4G channel is picked.

Because there is a LAN connection with the home AP or gateway it is possible to learn about the home AP or gateway through this connection, e.g. the home AP or gateway MAC address. The MAC address uniquely identifies the Wi-Fi beacon that belongs to the home AP or gateway. Embodiments of the invention perform a partial match of the LAN MAC address to the Wi-Fi MAC address to verify that the channel selected by the sensor gateway is that of the home AP or gateway. Other embodiments of the invention use a predefined API between the home gateway and sensor gateway to get the Wi-Fi MAC address by sending a command from the sensor gateway to home gateway.

As discussed above, the same channel is selected by the sensor gateway as that of the home AP or gateway, i.e. the home AP or gateway and sensor gateway are on same 2.4G channel. The carrier sense multiple access with collision avoidance (CSMA/CA) system arbitrates between the home AP or gateway and the sensor gateway. As such, there is no destructive interference between the sensor gateway and home AP or gateway.

Channel Selection

The following discussion describes how the AP or gateway and the sensor gateway agree upon the channel to use. When the sensor gateway boots up, it begins scanning the channels to identify APs and/or gateways that are close by. The sensor gateway scans each channel, looks at the average power levels on the channels, and selects the channel with the strongest average power level as the channel to which it sets itself. Thus, the sensor gateway selects a particular channel based upon received signal strength. The sensor gateway selects the same channel as that of the AP or gateway with the strongest signal because the AP or gateway on that channel is more likely to interfere with operation of the sensor gateway if both try to transmit at the same time on different channels.

In some cases there may be more than one AP and/or gateway with a strong received signal. In such case, the sensor gateway is manually set to the channel of the AP or gateway with which it is to coordinate its operation, as discussed above.

The sensor gateway does not stay on the same channel for all time once it makes a channel selection. If the home AP or gateway channel is changed, then an auto-channel mechanism sends a broadcast packet to every client that is associated with it so that they move to the new channel with it. Before it moves, the home AP or gateway sends a channel switch announcement. The channel switch announcement element is used by an AP in a BSS or a STA in an IBSS to advertise when it is changing to a new channel and the channel number of the new channel (see IEEE 802.11h). In 2007 the FCC (United States) began requiring that devices in operating in channels 52, 56, 60 and 64 in the 5 GHz band must have dynamic frequency selection (DFS) capabilities. This is to avoid communicating in the same frequency range as some RADAR. Embodiments of the invention adopt this mechanism for use with the sensor gateway. In this embodiment, upon receiving the CSA the sensor AP switches its channel to the new channel of the AP or gateway.

In another embodiment, the sensor gateway periodically scans its current channel. If it does not see the AP or gateway on this channel anymore it scans the other channels looking for the channel with the strongest average signal and then switches to that channel. It sends out the channel switch announcement to let the sensors it is configured with know that it is going to be on another channel so that they can follow it. If the sensor gateway does not send a channel switch announcement, the sensors do not know that the sensor gateway has changed channels. In such case, the sensors disconnect and look again and to find the sensor gateway. This wastes power. In embodiments of the invention, the sensors have a built-in CSA mechanism. In accordance with the invention, the sensors do not use much power transmitting or receiving because they do not need to rescan and reassociate. Thus, when the sensor gateway moves to another channel, the sensors listen and change their channel to that of the sensor gateway.

The following is an exemplary channel selection scheme for use in connection with embodiments of the invention:

1. If the sensor gateway channel scan detects one or more APs operating within close proximity to the sensor gateway, as estimated by the received signal strength indication (RSSI) from each AP, then the sensor gateway selects the same channel as the AP with highest RSSI. The sensor gateway also returns the channel, SSID, and BSSID to the application layer of all APs within three meters, as well as indicating the BSSID that it has selected.

2. If the sensor gateway has selected the channel of a nearby AP, it monitors that AP's traffic for channel change announcements, and follows that AP if the channel has changed.

3. On command from the host application, the sensor gateway may be forced to rescan channels for the best available network.

4. If at any time the sensor gateway changes its channel, it broadcasts a channel change announcement to all stations within the BSS.

5. Auto-channel selection is enabled by default. It is possible for the host application to disable auto-channel selection.

6. If at any time the sensor gateway determines that there is no longer an AP in close proximity, then it no longer follows any AP.

7. If the sensor gateway changes the AP that it is following, it announces the change to the application layer.

8. If the sensor gateway is following an AP and then no longer follows any AP, it announces the change to the application layer.

9. If the sensor gateway is manually set to follow an AP, it always follows that AP, even if there are closer APs or if that AP RSSI has dropped significantly low.

10. There is a programmable RSSI threshold to detect an AP within X meters, e.g. three meters, to allow adjustment of the RSSI threshold if needed. The threshold is in the non-volatile random access memory (NVRAM). −40 dBm can be used as a default value in the code for RSSI if the threshold is not present in the NVRAM.

11. In the absence of nearby APs, e.g. within three meters of the sensor gateway, the sensor gateway scans available Wi-Fi channels for best channel to use, based on a least used/least interfered with channel algorithm.

The sensor gateway must determine when the channel is clear and the channel must be clear for a certain percentage of time. The sensor gateway must have bandwidth available to allow it to communicate with the sensors. Once it gets the permission of the sensors, it buffers the sensor data and sends it out to the backend through the LAN connection with the home AP or gateway. There may be policies on the sensor gateway that determine which sensor data should be transmitted out to the cloud backend and which sensor data can be used only locally. These policies can be set by the user, depending on the user's privacy preferences.

Another enhancement provided by the arrangement of the sensor gateway and the sensors is the use of priority data. In IEEE 802.11 there are different priorities for different traffic, i.e. in order of priority lowest to highest there is background, best effort, video, and voice. The usual traffic is best effort traffic. Almost all traffic is best effort. In this scheme the highest priority is voice.

Embodiments of the invention send the sensor packets with the priority class that is tagged as video or voice. As such, the invention dynamically tags data that is not video or voice as though it were video or voice, depending upon sensor type, to provide a higher priority value to the data. To do this, the invention takes advantage of enhanced distributed channel access (EDCA). With EDCA, high-priority traffic has a higher chance of being sent than low-priority traffic: a station with high priority traffic waits a little less before it sends its packet, on average, than a station with low priority traffic. This is accomplished through the EDCA protocol, which is a derivative of CSMA/CA using a shorter arbitration inter-frame space (AIFS) and shorter back-off time for higher priority packets. The exact values depend on the physical layer that is used to transmit the data. In addition, EDCA provides contention-free access to the channel for a period called a transmit opportunity (TXOP). A TXOP is a bounded time interval during which a station can send as many frames as possible, as long as the duration of the transmissions does not extend beyond the maximum duration of the TXOP. If a frame is too large to be transmitted in a single TXOP, it is fragmented into smaller frames. The levels of priority in EDCA are called access categories (ACs). The contention window (CW) can be set according to the traffic expected in each access category, with a wider window needed for categories with heavier traffic. The CWmin and CWmax values are calculated from aCWmin and aCWmax values, respectively, that are defined for each physical layer supported by 802.11e.

There are predefined EDCA values for voice, video, data, and background which are defined in the IEEE 802.11 specification. The default EDCA-related parameters may be modified by a sensor related application layer if required. For example, if the high priority packets that are not transmitted have a delay that is not acceptable, the application layer may try to change some of EDCA related parameters to achieve an acceptable delay. Other physical layer receive threshold settings may also be changed, if needed. If an acceptable delay cannot be reached after changing the EDCA parameters and other receiver and transmitter settings, the application layer may issue a channel change or it may trigger an automatic channel selection command to find a better channel.

Embodiments of the invention also determine if the energy on the channel is above a predetermined threshold, i.e. the energy detect threshold. A channel is clear if the energy level is below the threshold and if no packets are being sent on the channel. The system uses the network allocation vector (NAV), which is a virtual carrier-sensing mechanism used with wireless network protocols such as IEEE 802.11 and IEEE 802.16 (WiMax). The virtual carrier sensing is a logical abstraction which limits the need for physical carrier-sensing at the air interface to save power. The MAC layer frame headers contain a duration field that specifies the transmission time required for the frame, in which time the medium is busy. The stations listening on the wireless medium read the duration field and set their NAV, which is an indicator for a station on how long it must defer from accessing the medium. The NAV may be thought of as a counter, which counts down to zero at a uniform rate. When the counter is zero, the virtual carrier sense indication is that the medium is idle; when nonzero, the indication is busy. The medium is determined to be busy when the STA is transmitting. In IEEE 802.11, the NAV represents the number of microseconds the sending STA intends to hold the medium busy (maximum of 32,767 microseconds).

Wireless stations are often battery-powered, so to conserve power the stations may enter a power-saving mode. A station decrements its NAV counter until it becomes zero, at which time it is awakened to sense the medium again. Embodiments of the invention set a threshold that reduces the duration field. In this way, the sensors are more aggressive in accessing the sensor gateway. A sensor typically sends, for example, one bit of information indicating, e.g. the sensor has detected that somebody has broken the glass of a window. In some embodiments of the invention remove the threshold altogether and have the sensor try to access the sensor gateway several times until it gets through.

In some embodiments of the invention, if the sensor finds that the channel is busy when it attempts to access the channel, the sensor may pick a random number and instead of listening for clean channel and waiting for a back-off number to reach zero when the channel is clean, the sensor may go to sleep, wake up after a random time and, if the channel is available when the client wakes up, the client transmits immediately and does not do the back-off.

EXAMPLES

Experiments were performed on operation of the sensor gateway with (wireless) and without (cabled) a coexistence feature. The Ethernet cabled operation meets the performance requirement of four active cameras if the sensor gateway follows home AP or gateway Wi-Fi channel. In this example, four cameras were streaming at 2 Mbps. The data in Tables 1-4 below are taken with background traffic ~35% airtime to the home AP or gateway. The traffic is used to simulate home traffic.

Figure 5:
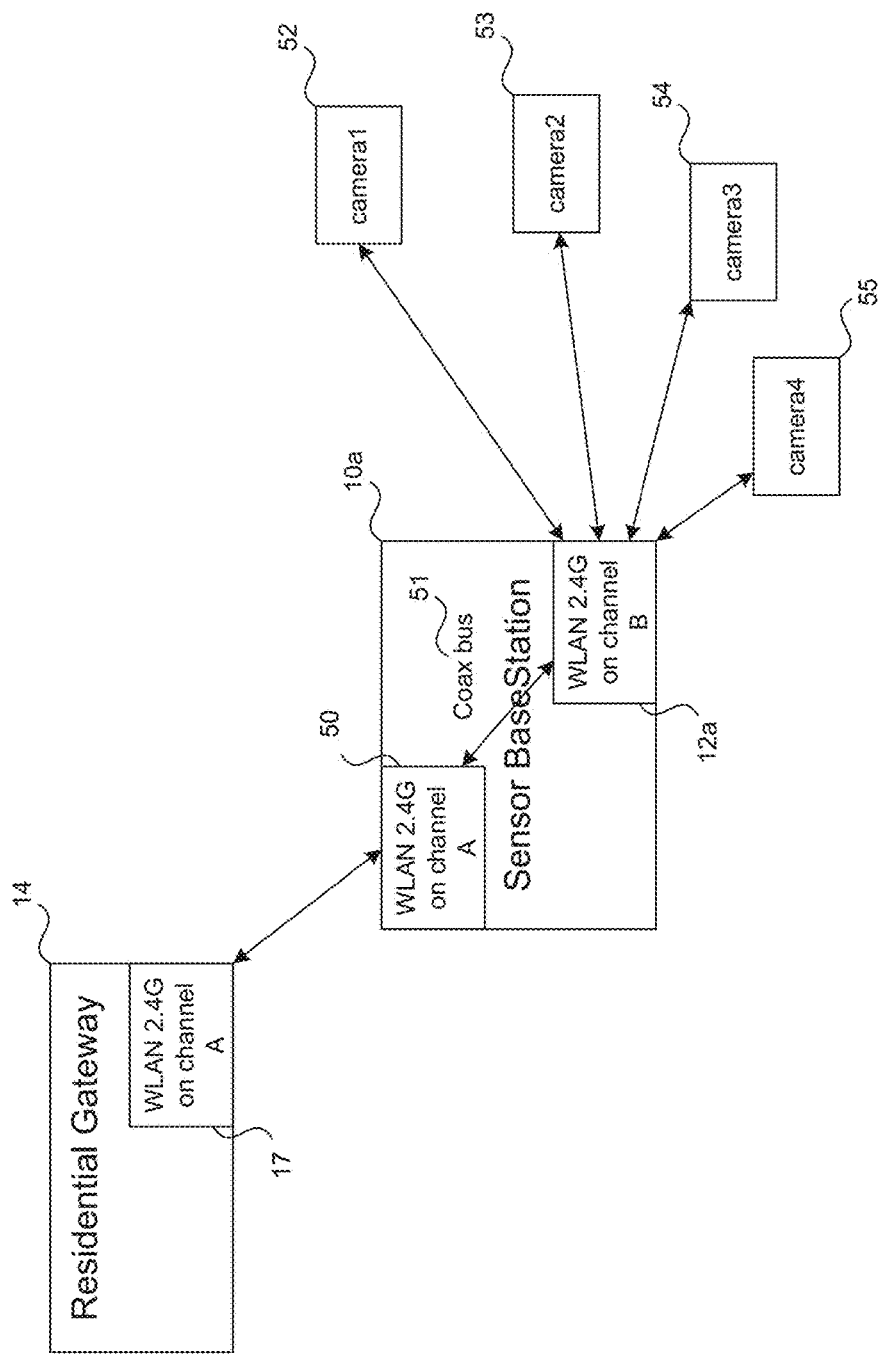
FIG. 5 is a block schematic diagram showing a wireless sensor gateway configuration according to the invention.

The data in Tables 1 and 2 relate to a wired arrangement as shown in FIG. 1 (discussed above); the data in Tables 3 and 4 relate to a wireless, coexistence, arrangement, as shown in FIG. 5.

FIG. 5 is a block schematic diagram showing a wireless sensor gateway configuration according to the invention. In FIG. 5, a sensor gateway 10a and home AP or gateway 14 communicate via a WLAN connection in the 2.4G band on channel A via respective radios 50, 17. The sensor gateway also communicates with various sensors, i.e. cameras 52-55, via a WLAN connection in the 2.4G band on channel B via a radio 12a. The two radios within the sensor gateway communicate via a coax bus 51.

As shown in Table 1, the results when the sensor gateway and home AP or gateway are on the same channel are good.

TABLE 1

Home AP + sensor gateway, cabled results for the same channel

| Wired-LAN Cable Length (ft) | Channel | Location-1 | Location-2 | Location-3 | Location-4 |
| --- | --- | --- | --- | --- | --- |
| 1 | 1/1 | Streaming | Streaming | Streaming | Streaming |
| 1 | 6/6 | Streaming | Streaming | Streaming | Streaming |
| 1 | 11/11 | Streaming | Streaming | Streaming | Streaming |
| 6 | 1/1 | Streaming | Streaming | Streaming | Streaming |
| 6 | 6/6 | Streaming | Streaming | Streaming | Streaming |
| 6 | 11/11 | Streaming | Streaming | Streaming | Streaming |
| 15 | 1/1 | Streaming | Streaming | Streaming | Streaming |
| 15 | 6/6 | Streaming | Streaming | Streaming | Streaming |
| 15 | 11/11 | Streaming | Streaming | Streaming | Streaming |

As shown in Table 2, the results when the sensor gateway and home AP or gateway are on different channels are bad.

TABLE 2

Home AP + sensor gateway, cabled results for a different channel

| Cabled Length (ft) | Channel | Location-1 | Location-2 | Location-3 | Location-4 |
| --- | --- | --- | --- | --- | --- |
| 1 | 1/6 | Streaming | Stopped | Stopped | Stopped |
| 1 | 1/11 | Streaming | Streaming | Stopped | Stopped |
| 1 | 6/11 | Stopped | Stopped | Stopped | Stopped |
| 6 | 1/6 | Streaming | Stopped | Stopped | Stopped |
| 6 | 1/11 | Streaming | Streaming | Streaming | Stopped |
| 6 | 6/11 | Streaming | Streaming | Stopped | Stopped |
| 15 | 1/6 | Stopped | Stopped | Stopped | Stopped |
| 15 | 1/11 | Streaming | Streaming | Streaming | Stopped |
| 15 | 6/11 | Streaming | Streaming | Streaming | Streaming |

As shown in Table 3, the results when the sensor gateway and home AP or gateway are on the same channel are mixed.

TABLE 3

Home AP + sensor gateway, wireless results for the same channel

| Distance Length (ft) | Channel | Location-1 | Location-2 | Location-3 | Location-4 |
|---|---|---|---|---|---|
| 1 | 1/1 | Streaming | Streaming | Streaming | Streaming |
| 1 | 6/6 | N/A | N/A | N/A | N/A |
| 1 | 11/11 | Streaming | Stopped | Streaming | Stopped |
| 6 | 1/1 | Streaming | Streaming | Streaming | Streaming |
| 6 | 6/6 | Streaming | Streaming | Stopped | Stopped |
| 6 | 11/11 | Streaming | Streaming | Streaming | Streaming |
| 15 | 1/1 | Streaming | Streaming | Streaming | Streaming |
| 15 | 6/6 | Streaming | Stopped | Streaming | Stopped |
| 15 | 11/11 | Streaming | Streaming | Streaming | Streaming |

As shown in Table 4, the results when the sensor gateway and home AP or gateway are on a different channel are bad.

TABLE 4

Home AP + sensor gateway, wireless results a different channel

| Distance Length (ft) | Channel | Location-1 | Location-2 | Location-3 | Location-4 |
|---|---|---|---|---|---|
| 1 | 1/6 | Stopped | Stopped | Stopped | Stopped |
| 1 | 1/11 | Streaming | Stopped | Stopped | Stopped |
| 1 | 6/11 | N/A | N/A | N/A | N/A |
| 6 | 1/6 | Stopped | Stopped | Stopped | Stopped |
| 6 | 1/11 | Streaming | Stopped | Stopped | Stopped |
| 6 | 6/11 | Streaming | Stopped | Stopped | Stopped |
| 15 | 1/6 | N/A | N/A | N/A | N/A |
| 15 | 1/11 | Streaming | Stopped | Stopped | Stopped |
| 15 | 6/11 | Streaming | Streaming | Stopped | Stopped |

The data shown in Tables 1-4 above confirms that when the home AP or gateway and the sensor gateway are on the same 2.4 G channel, the 802.11 MAC (CSMA/CA EDCA) help both the home AP or gateway and the sensor gateway to coexist. As shown, when the home AP or gateway and the sensor gateway are on different 2.4 G channels the system does not work well due to destructive interference from the home AP or gateway to the sensor gateway and vice versa.

Figure 6:
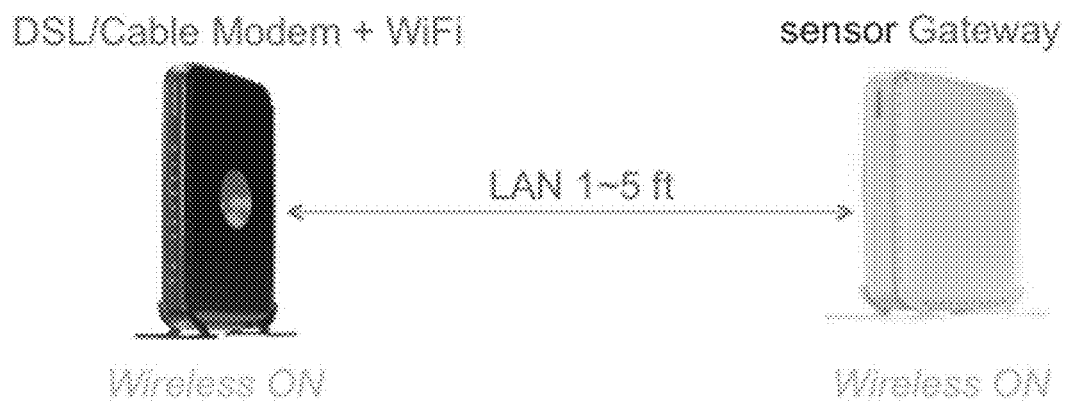
FIGS. 6-9 are block schematic diagrams of scenarios that show different arrangements for the home AP and/or gateway and the sensor gateway.

The following scenarios show different arrangements for the home AP and/or gateway and the sensor gateway:

In Scenario 1, as shown in FIG. 6, the home gateway and sensor gateway are on the same channel, where the sensor gateway follows the home gateway channel. This arrangement avoids interference.

Figure 7:
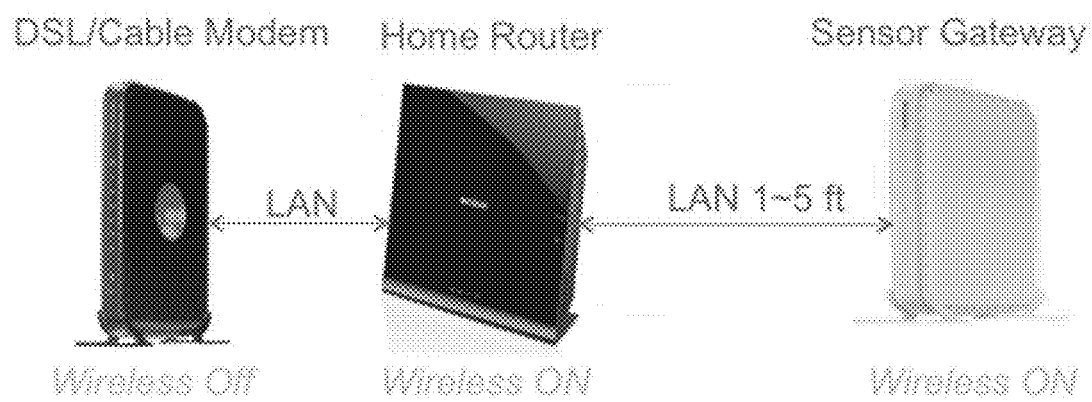

In Scenario 2, as shown in FIG. 7, the home AP and sensor gateway are on the same channel, where the sensor gateway follows the home AP channel. This arrangement avoids interference.

Figure 8:
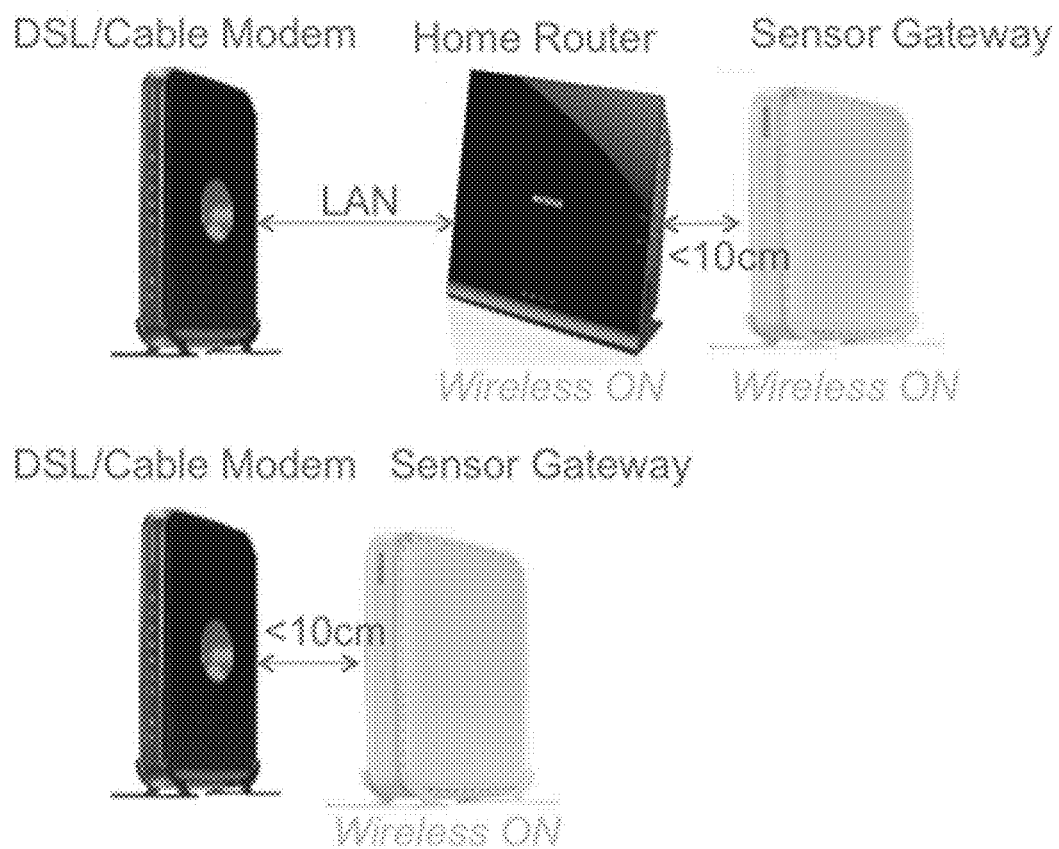

In Scenario 3, as shown in FIG. 8, the home AP, home gateway, and sensor gateway are on the same channel, where the sensor gateway follows the home gateway channel. In this arrangement, there is destructive interference between the home AP and sensor gateway and the home gateway and sensor gateway at very close range due to DDR noise, PCIE noise, and USB noise.

Figure 9:
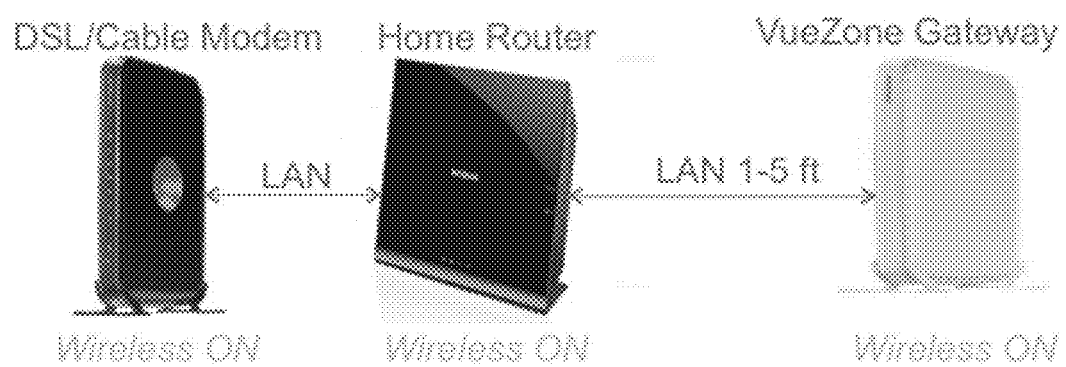

In Scenario 4, as shown in FIG. 9, the sensor gateway does not know which of the home gateway and home AP is the active AP unless the SSID is specified by the user.

Computer Implementation

Figure 10:
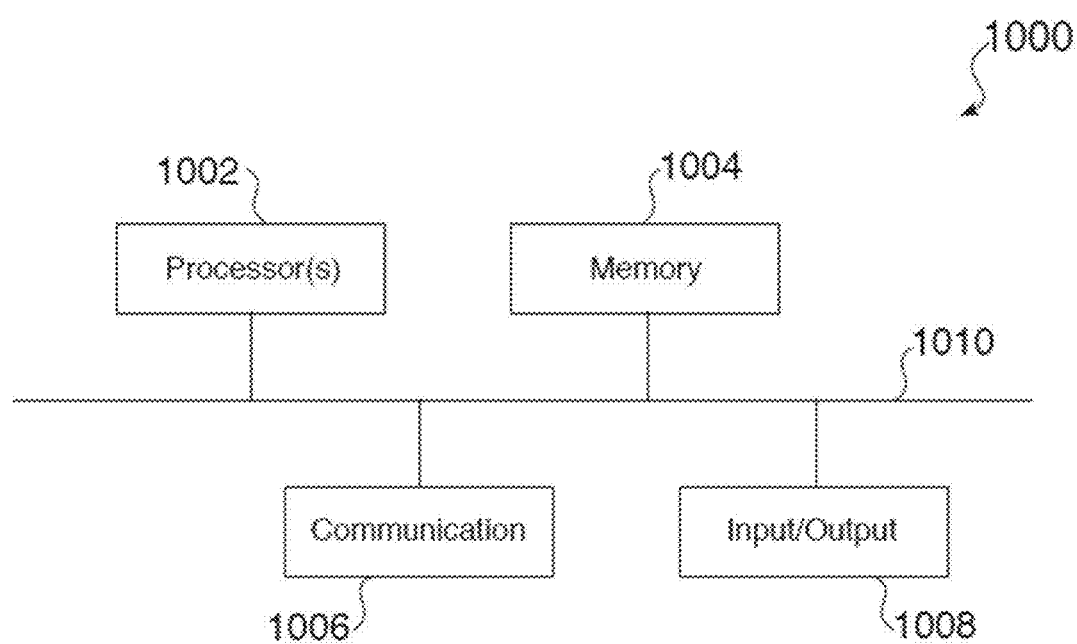
FIG. 10 is a block schematic diagram showing a machine in the example form of a computer system within which a set of instructions for causing the machine to perform one or more of the methodologies discussed herein may be executed.

FIG. 10 is a block diagram of a computer system that may be used to implement certain features of some of the embodiments of the invention. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 40 may include one or more central processing units ("processors") 45, memory 41, input/output devices 44, e.g. keyboard and pointing devices, touch devices, display devices, storage devices 42, e.g. disk drives, and network adapters 43, e.g. network interfaces, that are connected to an interconnect 46.

In FIG. 10, the interconnect is illustrated as an abstraction that represents any one or more separate physical buses, point-to-point connections, or both connected by appropriate bridges, adapters, or controllers. The interconnect, therefore, may include, for example a system bus, a peripheral component interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also referred to as Firewire.

The memory 41 and storage devices 42 are computer-readable storage media that may store instructions that implement at least portions of the various embodiments of the invention. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 41 can be implemented as software and/or firmware to program one or more processors to carry out the actions described above. In some embodiments of the invention, such software or firmware may be initially provided to the processing system 40 by downloading it from a remote system through the computing system, e.g. via the network adapter 43.

The various embodiments of the invention introduced herein can be implemented by, for example, programmable circuitry, e.g. one or more microprocessors, programmed with software and/or firmware, entirely in special-purpose hardwired, i.e. non-programmable, circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A sensor gateway for managing wireless communications between a plurality of sensors and a backend connection, the sensor gateway comprising:

a communications interface; and
a processor communicatively coupled to the communications interface, the processor configured to execute instructions to cause the sensor gateway to:
communicate wirelessly, via the communications interface, with the plurality of sensors over a first channel of a plurality of channels of a communications band;
exchange information between the plurality of sensors and the backend connection via a home access point (AP) or gateway, the home AP or gateway engaging in wireless communications within the communications band over a selected channel of the plurality of channels;
determine a characteristic of a beacon frame;
switch from the first channel to the selected channel when the characteristic of the beacon frame indicates that communication via the selected channel will be improved relative to communications via the first channel; and
communicate via the same channel as the home AP or gateway thereby facilitating reduced communication interference between the sensor gateway and the home AP or gateway, the same channel being the selected channel.

2. The sensor gateway of claim 1, wherein the processor is configured to execute further instructions to cause the sensor gateway to further:
provide the plurality of sensors with low power, wireless support and deep sleep support.

3. The sensor gateway of claim 1, wherein the communications interface is configured to operate in multiple bands and wherein communications with the plurality of sensors is over a different band than communications with the home AP or gateway.

4. The sensor gateway of claim 1, wherein the communications interface comprises a radio configured to operate in a 2.4 GHz band.

5. The sensor gateway of claim 1, wherein the communications interface comprises:
a first radio configured to operate in a 2.4 GHz band; and
a second radio configured to operate in a 5 GHz band;
wherein communications with the plurality of sensors is via the first radio and communications with the home AP or gateway is via the second radio.

6. The sensor gateway of claim 1, wherein switching from the first channel to the selected channel is based on the characteristics of the beacon frame indicating a strongest beacon.

7. The sensor gateway of claim 1, wherein the processor is configured to execute further instructions to cause the sensor gateway to further:
listen for communications by the home AP or gateway; and
transmit a back off signal to the home AP or gateway to share the selected channel.

8. The sensor gateway of claim 1 wherein the processor is configured to execute further instructions to cause the sensor gateway to further:
receive sensor data from the plurality of sensors;
process the sensor data; and
transmit selected processed sensor data to the backend connection.

9. The sensor gateway of claim 1 wherein the processor is configured to execute further instructions to cause the sensor gateway to further:
buffer sensor data received from the plurality of sensors before sending the sensor data to the backend connection.

10. The sensor gateway of claim 1, wherein the processor is configured to execute further instructions to cause the sensor gateway to further:
send a channel switch announcement to the plurality of sensors when switching to another channel to enable the plurality of sensors to follow the sensor gateway.

11. The sensor gateway of claim 1, wherein the processor is configured to execute further instructions to cause the sensor gateway to further:
keeping a communications link with the plurality of sensors alive without requiring keep alive packets or other periodic transactions thereby reducing battery usage by the plurality of sensors.

12. The sensor gateway of claim 1, further comprising:
a data storage device;
wherein the processor is configured to execute further instructions to cause the sensor gateway to further:
store sensor data received from the plurality sensors.

13. The sensor gateway of claim 1, wherein the processor is configured to execute further instructions to cause the sensor gateway to further:
employ a channel selection scheme in which any of the following steps are performed:
when a scan by the sensor gateway channel detects one or more APs or gateways operating within close proximity to the sensor gateway, as estimated by a received signal strength indication (RSSI) from each AP, then the sensor gateway switching from said selected channel to another channel based on the AP with highest RSSI, wherein the sensor gateway also returns data that indicates an SSID and BSSID, utilized in association with the other channel, to the application layer of all APs within three meters;
when the sensor gateway has selected a channel of a nearby AP or gateway, it monitors that AP's or gateway's traffic for channel change announcements, and follows a channel change of that AP if the channel has changed;
on command from a host application, forcing the sensor gateway to rescan channels for a best available network;
if at any time the sensor gateway changes its channel, it broadcasts a channel change announcement to all stations within a BSS;
enabling auto-channel selection by default, wherein the host application can disable auto-channel selection;
if at any time the sensor gateway determines that there is no longer an AP in close proximity, then it no longer follows channel changes of any AP;
when the sensor gateway changes a communication channel of an AP with which it is in communication, it announces the change to an application layer;
when the sensor gateway is following channel changes of an AP and then no longer follows channel changes of any AP, it announces the change to the application layer;
when the sensor gateway is manually set to follow channel changes of an AP, it always follows channel changes of that AP, even if there are closer APs or if that AP RSSI has dropped significantly low;
providing a programmable RSSI threshold to detect an AP within a predetermined distance to allow adjustment of the programmable RSSI threshold if needed; and the sensor gateway scanning available Wi-Fi channels for a best channel to use, based on a least used/least interfered with channel algorithm in the absence of nearby APs.

14. A non-transient machine readable storage medium for use in a processing system, the non-transitory machine-readable storage medium storing instructions, an execution of which in the processing system causes the processing system to perform operations comprising:
communicating wirelessly with a plurality of sensors over a first channel of a plurality of channels of a communications band;
exchanging information between the plurality of sensors and a backend connection via a home access point (AP) or gateway, the home AP or gateway engaging in wireless communications within the communications band over a selected channel of the plurality of channels;
determining a characteristic of a beacon frame;
switching from the first channel to the selected channel when the characteristic of the beacon frame indicates that communication via the selected channel will be improved relative to communications via the first channel; and
communicating via the same channel as the home AP or gateway thereby facilitating reduced communication interference between the sensor gateway and the home AP or gateway, the same channel being the selected channel.

15. The non-transient machine readable storage medium of claim 14, storing further instructions, an execution of which in the processing system causes the processing system to perform operations further comprising:
providing the plurality of sensors with low power, wireless support and deep sleep support.

16. The non-transient machine readable storage medium of claim 14, wherein switching from the first channel to the selected channel is based on the characteristics of the beacon frame indicating a strongest beacon.

17. The non-transient machine readable storage medium of claim 14, storing further instructions, an execution of which in the processing system causes the processing system to perform operations further comprising:
listening for communications by the home AP or gateway; and
transmitting a back off signal to the home AP or gateway to share the selected channel.

18. The non-transient machine readable storage medium of claim 14, storing further instructions, an execution of which in the processing system causes the processing system to perform operations further comprising:
receiving sensor data from the plurality of sensors;
processing the sensor data; and
transmitting selected processed sensor data to the backend connection.

19. The non-transient machine readable storage medium of claim 14, storing further instructions, an execution of which in the processing system causes the processing system to perform operations further comprising:
buffering sensor data received from the plurality of sensors before sending the received sensor data to the backend connection.

20. The non-transient machine readable storage medium of claim 14, storing further instructions, an execution of which in the processing system causes the processing system to perform operations further comprising:
sending a channel switch announcement to the plurality of sensors when switching to another channel.

21. The non-transient machine readable storage medium of claim 14, storing further instructions, an execution of which in the processing system causes the processing system to perform operations further comprising:
keeping a communications link with the plurality of sensors alive without requiring keep alive packets or other periodic transactions thereby reducing battery usage by the plurality of sensors.

22. A system comprising:
a plurality of wireless sensor devices;
a home access point (AP) or gateway device communicatively coupled to a backend connection; and
a sensor gateway device configured to manage communications between the plurality of wireless sensor devices and the backend connection by:
communicating wirelessly with the plurality of wireless sensors over a first channel of a plurality of channels of a communications band;
exchanging information between the plurality of wireless sensors and the backend connection via the home AP or gateway, the home AP or gateway engaging in wireless communications within the communications band over a selected channel of the plurality of channels;
determining a characteristic of a beacon frame;
switching from the first channel to the selected channel when the characteristic of the beacon frame indicates that communication via the selected channel will be improved relative to communications via the first channel; and
communicating via the same channel as the home AP or gateway thereby facilitating reduced communication interference between the sensor gateway and the home AP or gateway, the same channel being the selected channel.

23. The system of claim 22, wherein the sensor gateway is further configured to:
provide the plurality of wireless sensors with low power, wireless support and deep sleep support.

24. The system of claim 22, wherein communications between the sensor gateway and the plurality of wireless sensors is over a different band than communications between the home AP or gateway.

25. The system of claim 22, wherein the sensor gateway includes:
a first radio configured to operate in a 2.4 GHz band; and
a second radio configured to operate in a 5 GHz band;
wherein communications between the sensor gateway and the plurality of wireless sensors is via the first radio and communications between the sensor gateway and the home AP or gateway is via the second radio.

26. The system of claim 22, wherein the sensor gateway and home AP or gateway are communicatively coupled via a wired communications link.

27. The system of claim 22, wherein the plurality of wireless sensors include wireless cameras.

28. The system of claim 22, the backend connection comprising a cloud-based backend.

29. The system of claim 22, wherein the plurality of wireless sensors include a software API for connecting directly with the sensor gateway; but not to the backend connection.

30. The system of claim 22, wherein the sensor gateway and home AP or gateway communicate via a predefined API.

31. The system of claim 22, wherein switching from the first channel to the selected channel is based on the characteristics of the beacon frame indicating a strongest beacon.

32. The system of claim 22, wherein the sensor gateway is further configured to:
- listen for communications by the home AP or gateway; and
- transmit a back off signal to the home AP or gateway to share the selected channel.

33. The system of claim 22, wherein the sensor gateway is further configured to:
- control a rate at which information is exchanged between the plurality of wireless sensors and the backend connection via the home AP or gateway.

34. The system of claim 22, wherein the sensor gateway is further configured to:
- keep a communications link with the plurality of wireless sensors alive without requiring keep alive packets or other periodic transactions thereby reducing battery usage by the plurality of wireless sensors.

* * * * *